(12) United States Patent  
Sasagawa

(10) Patent No.: US 11,748,600 B2  
(45) Date of Patent: Sep. 5, 2023

(54) QUANTIZATION PARAMETER OPTIMIZATION METHOD AND QUANTIZATION PARAMETER OPTIMIZATION DEVICE

(71) Applicant: SOCIONEXT INC., Kanagawa (JP)

(72) Inventor: Yukihiro Sasagawa, Yokohama (JP)

(73) Assignee: SOCIONEXT INC., Kanagawa (JP)

(*) Notice: Subject to any disclaimer, the term of this patent is extended or adjusted under 35 U.S.C. 154(b) by 585 days.

(21) Appl. No.: 17/014,699

(22) Filed: Sep. 8, 2020

(65) Prior Publication Data

US 2021/0073635 A1    Mar. 11, 2021

(30) Foreign Application Priority Data

Sep. 9, 2019   (JP) ................................ 2019-163981

(51) Int. Cl.  
    *G06N 3/063*          (2023.01)  
    *G06N 3/08*            (2023.01)  
    (Continued)

(52) U.S. Cl.  
    CPC ........... *G06N 3/063* (2013.01); *G06F 18/214* (2023.01); *G06F 18/2431* (2023.01);  
    (Continued)

(58) Field of Classification Search  
    CPC ........ G06N 20/00; G06N 20/10; G06N 20/20; G06N 3/063; G06N 3/08; G06N 3/092;  
    (Continued)

(56) References Cited

U.S. PATENT DOCUMENTS

2019/0138882 A1*   5/2019   Choi .................... G06N 3/048  
2019/0347550 A1*   11/2019   Jung ..................... G06N 3/08  
(Continued)

OTHER PUBLICATIONS

Kazutoshi Hirose, Ryota Uematsu, Kota Ando, Kodai Ueyoshi, Masayuki Ikebe, Tetsuya Asai, Masato Motomura, and Shinya Takamaeda-Yamazaki, "Quantization Error-Based Regularization for Hardware-Aware Neural Network Training," IEICE Transactions on Nonlinear Theory and Its Applications, vol. 9, No. 4, pp. 453-465, Oct. 2018.

(Continued)

*Primary Examiner* — Shane D Woolwine  
(74) *Attorney, Agent, or Firm* — McDermott Will & Emery LLP

(57) ABSTRACT

A quantization parameter optimization method includes: determining a cost function in which a regularization term is added to an error function, the regularization term being a function of a quantization error that is an error between a weight parameter of a neural network and a quantization parameter that is a quantized weight parameter; updating the quantization parameter by use of the cost function; and determining, as an optimized quantization parameter of a quantization neural network, the quantization parameter with which a function value derived from the cost function satisfies a predetermined condition, the optimized quantization parameter being obtained as a result of repeating the updating, the quantization neural network being the neural network, the weight parameter of which has been quantized, wherein the function value derived from the regularization term and an inference accuracy of the quantization neural network are negatively correlated.

10 Claims, 16 Drawing Sheets

(51) Int. Cl.
*G06N 20/10* (2019.01)
*G06F 18/214* (2023.01)
*G06F 18/2431* (2023.01)
*G06F 18/2451* (2023.01)
*G06F 18/2453* (2023.01)

(52) U.S. Cl.
CPC ...... *G06F 18/2451* (2023.01); *G06F 18/2453* (2023.01); *G06N 3/08* (2013.01); *G06N 20/10* (2019.01)

(58) Field of Classification Search
CPC . G06F 18/214; G06F 18/2431; G06F 18/2451
See application file for complete search history.

(56) References Cited

U.S. PATENT DOCUMENTS

2020/0311522 A1* 10/2020 Tzoufras .................. G06N 3/02
2021/0019630 A1* 1/2021 Yao ........................ G06N 3/045

OTHER PUBLICATIONS

Kazutoshi Hirose, Kota Ando, Kodai Ueyoshi, Masayuki Ikebe, Tetsuya Asai, Masato Motomura, and Shinya Takamaeda-Yamazaki, "Quantization Error-Based Regularization in Neural Networks," Max Bramer Miltos Petridis (Eds.), Artificial Intelligence XXXIV, 37th SGAI International Conference on Artificial Intelligence, AI 2017 Cambridge, UK, December 12â€"14, 2017 Proceedings, pp. 137-142.

Hirose K. et al., "Quantization Error-Based Regularization in Neural Networks," Quantization Error-Based Regularization in Neural Networks. In: Bramer M., Petridis M. (eds), Artificial Intelligence XXXIV. SGAI 2017. Lecture Notes in Computer Science, vol. 10630. Springer, Cham, https://rd.springer.com/chapter/10.1007/978-3-319-71078-5_11, Nov. 21, 2017.

* cited by examiner

FIG. 4

| All results | | | |
|---|---|---|---|
| Inferred as positive | | Inferred as negative | |
| False positive | True positive | False negative | True negative |
| FP | TP | FN | TN |

QUANTIZATION PARAMETER OPTIMIZATION METHOD AND QUANTIZATION PARAMETER OPTIMIZATION DEVICE

CROSS REFERENCE TO RELATED APPLICATION

The present application is based on and claims priority of Japanese Patent Application No. 2019-163981 filed on Sep. 9, 2019. The entire disclosure of the above-identified application, including the specification, drawings and claims is incorporated herein by reference in its entirety.

FIELD

The present disclosure relates to a quantization parameter optimization method and a quantization parameter optimization device.

BACKGROUND

An inference model represented as a neural network is used for identification or classification of input data.

In machine learning, overfitting can occur, which is a state in which an inference model having been trained on training data outputs a highly accurate result for the training data, while outputting a poor result for unknown data.

Such state of overfitting can occur when, for example, an inference model is relatively more complex than training data. More specifically, overfitting is a phenomenon that occurs when a model with extreme parameter setting is selected as an inference model from among a plurality of "correct" models for the training data, as a result of which the accuracy of an output result for unknown data degrades.

To prevent overfitting, a method known as regularization is used that gives a penalty to an increase in the complexity of a model.

In the implementation of an inference model, a weight parameter is quantized to reduce computation. In so doing, an error function is required to be considered that also takes into account a quantization error which results from quantizing the weight parameter. For example, non-patent literature (NPL) 1 discloses adding a quantization error to an error function as a regularization term. NPL 1 enables learning with reduced quantization error by use of a cost function in which a quantization error is added to an error function as a regularization term.

CITATION LIST

Non Patent Literature

NPL 1: Kazutoshi Hirose, Ryota Uematsu, Kota Ando, Kodai Ueyoshi, Masayuki Ikebe, Tetsuya Asai, Masato Motomura, and Shinya Takamaeda-Yamazaki: Quantization Error-Based Regularization for Hardware-Aware Neural Network Training, IEICE Transactions on Nonlinear Theory and Its Applications, Vol. 9, No. 4, pp. 453-465, October 2018.

SUMMARY

Technical Problem

However, NPL 1 has a problem, in minimizing the cost function, that an error function increases instead of going to 0 when the regularization term is 0, depending on the value of a learning coefficient represented by a quantization error coefficient.

The present disclosure has been conceived in view of the above circumstances, and its object is to provide a quantization parameter optimization method and so forth capable of optimizing a quantization parameter in consideration of a quantization error, while preventing overfitting.

Solution to Problem

To achieve the above object, the quantization parameter optimization method according to one aspect of the present disclosure is a quantization parameter optimization method of optimizing a quantization parameter that is a weight parameter in a neural network having been quantized. Such quantization parameter optimization method includes: determining a cost function in which a regularization term is added to an error function, the regularization term being a function of a quantization error that is an error between the weight parameter and the quantization parameter, the error function being a function for determining an error between an output value of the neural network and a corresponding teaching data value; updating the quantization parameter by use of the cost function; and determining, as an optimized quantization parameter of a quantization neural network, the quantization parameter with which a function value derived from the cost function satisfies a predetermined condition, the optimized quantization parameter being obtained as a result of repeating the updating, the quantization neural network being the neural network, the weight parameter of which has been quantized. Here, the function value derived from the regularization term and an inference accuracy of the quantization neural network are negatively correlated.

This structure enables to optimize the quantization parameter in consideration of a quantization error, while preventing overfitting.

Here, the inference accuracy may be, for example, at least one of or any combination of a precision, a recall, an F-measure calculated as a harmonic mean of the precision and the recall, and a hit rate, when the inference accuracy indicates whether an output value of the quantization neural network is a true value.

The quantization parameter optimization method may further include, for example: generating learning data that is a dataset including values of a weight error parameter that is the weight parameter to which a plurality of errors have been added and accuracies of output values for test data, by assigning labels to the values of the weight error parameter corresponding to the output values, the labels indicating whether the accuracies of the output values are each higher or lower than a predetermined criterion, the output values being obtained for the test data by use of the quantization neural network provided with the weight error parameter, performing learning by a support vector machine (SVM) by use of the learning data generated to obtain a separating hyperplane that is a plane separating the values of the weight error parameter into values corresponding to ones of the output values with accuracies higher than the predetermined criterion and values corresponding to ones of the output values with accuracies lower than the predetermined criterion; and determining the regularization term based on the separating hyperplane obtained in the performing of the learning.

In the quantization parameter optimization method, for example, in the determining of the regularization term, $g(x)$ may be derived from the separating hyperplane to determine the regularization term based on the g(x) derived, and when the separating hyperplane is obtained by performing two-class linear SVM learning as the learning by the SVM, the g(x) may be represented by $A^T x+b=g(x)$, where x represents the quantization error of an n-dimensional vector, A represents the n-dimensional vector, and b represents a constant.

Also, in the determining of the regularization term, g(x) may be derived from the separating hyperplane to determine the regularization term based on the g(x) derived, and when the separating hyperplane is obtained by performing one-class nonlinear SVM learning as the learning by the SVM, the g(x) may be represented by $\Sigma_{i=1}^{N} \alpha_i K(\tilde{w}_{si}, w-w^q)+b=g(x)$, where $w^q$ represents the quantization parameter, $w-w^q$ represents the quantization error, $\alpha_i$ represents a coefficient, K represents a kernel function, $\tilde{w}_{si}$ represents a support vector, and b represents a constant.

Also, the kernel function may be, for example, a Gaussian kernel.

Also, the kernel function may be, for example, a sigmoid kernel.

Also, the kernel function may be, for example, a polynomial kernel.

Also, in the determining of the regularization term, the regularization term may be determined based on tan h(−g(x)) that is a function of the g(x).

Also, to achieve the above object, the quantization parameter optimization device according to another aspect of the present disclosure is a quantization parameter optimization device that determines a quantization parameter that is a weight parameter in a neural network having been quantized. Such quantization parameter optimization device includes: a cost function determiner that determines a cost function in which a regularization term is added to an error function, the regularization term being a function of a quantization error that is an error between the weight parameter and the quantization parameter, the error function being a function for determining an error between an output value of the neural network and a corresponding teaching data value; an updater that updates the quantization parameter by use of the cost function; and a quantization parameter determiner that determines, as an optimized quantization parameter of a quantization neural network, the quantization parameter with which a function value derived from the cost function satisfies a predetermined condition, the optimized quantization parameter being obtained as a result of the updater repeating updating the quantization parameter, the quantization neural network being the neural network, the weight parameter of which has been quantized. Here, the function value derived from the regularization term and an inference accuracy of the quantization neural network are negatively correlated.

Note that these comprehensive or specific aspects may be implemented as a device, a method, an integrated circuit, a computer program, or a computer-readable recording medium such as a CD-ROM, or may be implemented as any combination of a system, a method, an integrated circuit, a computer program, and a recording medium.

Advantageous Effects

The present disclosure is capable of providing a quantization parameter optimization method and so forth capable of optimizing a quantization parameter in consideration of a quantization error, while preventing overfitting.

BRIEF DESCRIPTION OF DRAWINGS

These and other advantages and features will become apparent from the following description thereof taken in conjunction with the accompanying Drawings, by way of nonlimiting examples of embodiments disclosed herein.

FIG. 4 is a diagram for explaining statistical indicators including the recall and precision.

DESCRIPTION OF EMBODIMENT

The following describes in detail the embodiment according to the present disclosure with reference to the drawings. Note that the following embodiment shows a comprehensive illustration of the present disclosure. The numerical values, shapes, materials, specifications, structural components, the arrangement and connection of the structural components, steps, the processing order of the steps, etc. shown in the following embodiment are mere examples, and thus are not intended to limit the present disclosure. Of the structural components described in the following embodiment, structural components not recited in any one of the independent claims that indicate the broadest concepts of the present disclosure will be described as optional structural components. Also note that the drawings are not necessarily precise illustrations. Also, substantially the same structural components are assigned the same reference marks throughout the drawings, and their repetitive descriptions will be omitted or simplified.

Embodiment

The quantization parameter optimization method and the quantization parameter optimization device according to the embodiment will be first described.

1-1. Quantization Parameter Optimization Device

Figure 1:
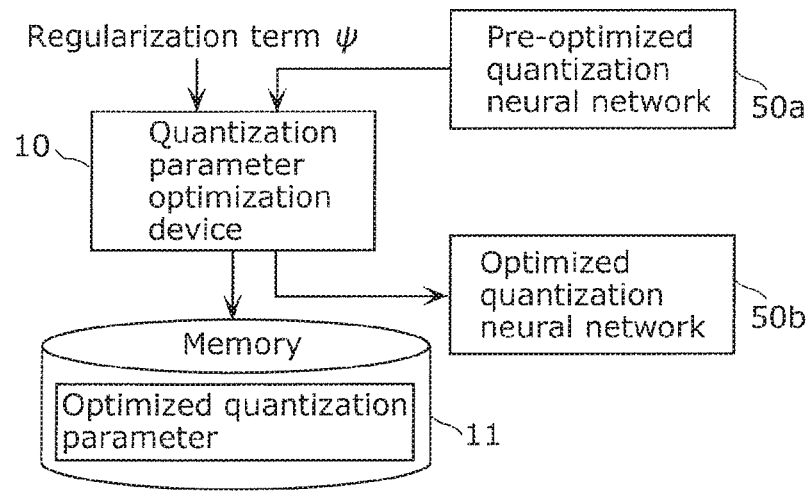
FIG. 1 is a diagram for explaining an overview of an optimization process performed by a quantization parameter optimization device according to an embodiment of the present disclosure.

The following describes the structure and so forth of the quantization parameter optimization device according to the present embodiment. FIG. 1 is a diagram for explaining an overview of an optimization process performed by quantization parameter optimization device 10 according to the embodiment.

Quantization parameter optimization device 10 is a device that optimizes a quantization parameter, which is a quantized weight parameter in a neural network. Here, the weight parameter is represented by a numerical value, e.g., a real number or a floating-point precision (also referred to as "float"), and the quantization parameter is represented by a numerical value, e.g., a fixed point precision. Quantization neural network 50a before being optimized (hereinafter "pre-optimized quantization neural network 50a") and quantization neural network 50b after being optimized (hereinafter "optimized quantization neural network 50b") are inference models represented as neural networks having quantization parameters, which are quantized weight parameters. Pre-optimized quantization neural network 50a includes a quantization parameter not optimized yet and optimized quantization neural network 50b includes a quantization parameter having been optimized. Pre-optimized quantization neural network 50a is neural network 50 (not illustrated) having a quantization parameter that is obtained by quantizing a weight parameter represented by a real number or a floating-point precision (float) after the training on neural network 50 completes.

More specifically, as shown in FIG. 1, quantization parameter optimization device 10 obtains regularization term $\psi$, and optimizes a quantization parameter of pre-optimized quantization neural network 50a, using a cost function to which such obtained regularization term $\psi$ is added. Subsequently, quantization parameter optimization device 10 stores the optimized quantization parameter (quantization parameter having been optimized) into memory 11, and applies the optimized quantization parameter to pre-optimized quantization neural network 50a, thereby generating optimized quantization neural network 50b.

Quantization parameter optimization device 10 repeats updating the quantization parameter, using the cost function to which the obtained regularization term $\psi$ is added, thereby optimizing the quantization parameter.

Note that quantization of all tensors involved in pre-optimized quantization neural network 50a and optimized quantization neural network 50b is not necessary, and thus at least tensors representing weight parameters are required to be quantized. A tensor is represented by an n-dimensional array (n is an integer of 0 or greater) that includes input data, output data, and parameters such as weights in each layer of pre-optimized quantization neural network 50a and optimized quantization neural network 50b.

Figure 2:
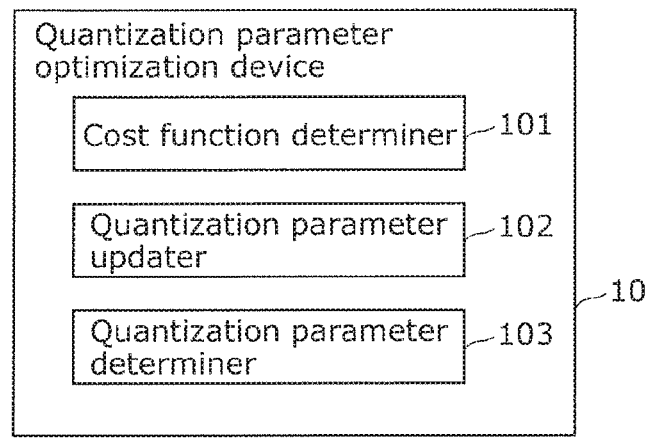
FIG. 2 is a block diagram of a functional structure of the quantization parameter optimization device according to the embodiment.

FIG. 2 is a block diagram of a functional structure of quantization parameter optimization device 10 according to the embodiment.

As shown in FIG. 2, quantization parameter optimization device 10 includes cost function determiner 101, quantization parameter updater 102, and quantization parameter determiner 103. Note that quantization parameter optimization device 10 according to the present embodiment may further include regularization term determiner 20 to be described later. In this case, quantization parameter optimization device 10 obtains, from regularization term determiner 20, regularization term $\psi$ determined by regularization term determiner 20.

<Quantization Parameter Updater 102>

Quantization parameter updater 102, which is an example of the updater, updates the quantization parameter, using a cost function determined by cost function determiner 101. Here, the quantization parameter is a quantized weight parameter in the neural network as described above. Quantization parameter updater 102 repeats updating the quantization parameter.

<Quantization Parameter Determiner 103>

Quantization parameter determiner 103 determines, as an optimized quantization parameter of the quantization neural network, the quantization parameter with which the function value derived from the cost function satisfies a predetermined condition. Such optimized quantization parameter is obtained as a result of quantization parameter updater 102 repeating the update of the quantization parameter.

<Cost Function Determiner 101>

Cost function determiner 101 determines a cost function, using the obtained regularization term $\psi$. More specifically, cost function determiner 101 determines cost function $L(w^q)$, where regularization term $\psi$, which is a function of quantization error $(w-w^q)$ between weight parameter (w) and quantization parameter $(w^q)$, is added to error function $E(w^q)$, which is a function for determining an error between an output value of the neural network and a corresponding teaching data value.

Here, the function value of regularization term $\psi$ and the inference accuracy of the quantization neural network are negatively correlated. In other words, regularization term $\psi$, which is incorporated in the cost function, satisfies the relation that the cost function is 0 when regularization term ψ is 0. The following describes the reason that regularization term ψ needs to satisfy such relation.

A gradient method is a representative learning algorithm used in machine learning. The gradient method, which is one of the methods of function optimization, identifies the optimal point, using a partial derivative (gradient) of a function. For example, Expression (1) below represents momentum stochastic gradient descent (SGD), in which iterative computation is performed by multiplying a partial differential with respect to weight w of error function E by a coefficient.

[Math 1]

$$w^{t+1} \leftarrow w^t - \eta \frac{\partial E(w^t)}{\partial w^t} + \alpha \Delta w^t \quad (1)$$

Stated differently, in Expression (1), weight w of iteration t+1 is computed, using error function E in weight w of iteration t. Through such iterative computation, weight w that minimizes error function E is obtained. Here, η represents a learning coefficient for controlling the speed of convergence. Note that $\alpha \Delta w^t$ corresponds to an inertial component.

Further, a regularization term is added to error function E to give the penalty properties to error function E and prevent weight w from taking an extreme value (i.e., to prevent overfitting), thereby obtaining a new error function, i.e., a cost function. For example, as shown in Expression (2), L2 regularization is used as a regularization term, where the sum of the square of weight w is used as a penalty. In Expression (2), L(w) represents a cost function and E(w) represents an error function.

[Math. 2]

$$L(w) = E(w) + \eta \cdot \frac{1}{2} \cdot \Sigma_i |w_i|^2 \quad (2)$$

Here, assuming that cost function L(w) in Expression (2) is a partial differential, Expression (3) below is obtained.

[Math 3]

$$\frac{\partial E(w)}{\partial w_i} + \eta w_i \quad (3)$$

From Expression (3), the regularization term is proportional to weight w, suggesting that the use of the cost function shown in Expression (2) to perform the steepest descent method or the momentum SGD results in an error closer to 0 by an amount by which the regularization term is proportional to the magnitude of weight w. As shown above, the use of the regularization term prevents significant changes in weight w in cost function L(w), thus preventing overfitting.

Meanwhile, in the implementation of an inference model represented as a neural network, a weight parameter is quantized in some cases to reduce computation. In this case, an error function needs to be considered that also takes into account a quantization error, which is the difference between a weight parameter represented by a float (real number, etc.) and a quantization parameter, which is a representation of the quantized float. This is because, compared to an inference model represented as a neural network having a weight parameter, the inference accuracy of a result of an inference model represented as a quantization neural network having a quantization parameter degrades due to a quantization error.

For example, the influence of a quantization error, when reflected in Expression (1) above, is expressed as shown in Expression (4) below.

[Math 4]

$$w^{t+1} \leftarrow w^t - \eta \left( \frac{\partial E(w^t)}{\partial w^t} + \text{err} \right) + \alpha \Delta w^t \quad (4)$$

Stated differently, the influence of the quantization error appears as the err term within the bracket ( ) in Expression (4). Such err term then has an influence on the convergence of the iterative computation in Expression (4). The use of a smaller learning coefficient η to minimize the influence of the err term, however, rises a problem that the resulting value is likely to be extremely small.

In view of this, as shown in Expression (5), NPL 1 discloses, for example, the use of cost function L(w), where a quantization error is added as a regularization term to error function E(w) in the form of L2 norm. NPL 1 describes that the use of such cost function L(w) achieves learning with reduced quantization error. In Expression (5), $W^q$ represents a quantization parameter obtained by quantizing weight parameter w.

[Math 5]

$$L(w) = E(w) + \eta_2 \|w - w^q\|_2 = E(w) + \eta_2 \cdot \frac{1}{2} \cdot \sum_i |w_i - w_i^q|^2 \quad (5)$$

However, in minimizing cost function L(w), an error function increases instead of going to 0 when the regularization term is 0, depending on the value of learning coefficient $\eta_2$ represented by a quantization error coefficient. This will be described in detail below with reference to FIG. 3A and FIG. 3B.

Figure 3A:
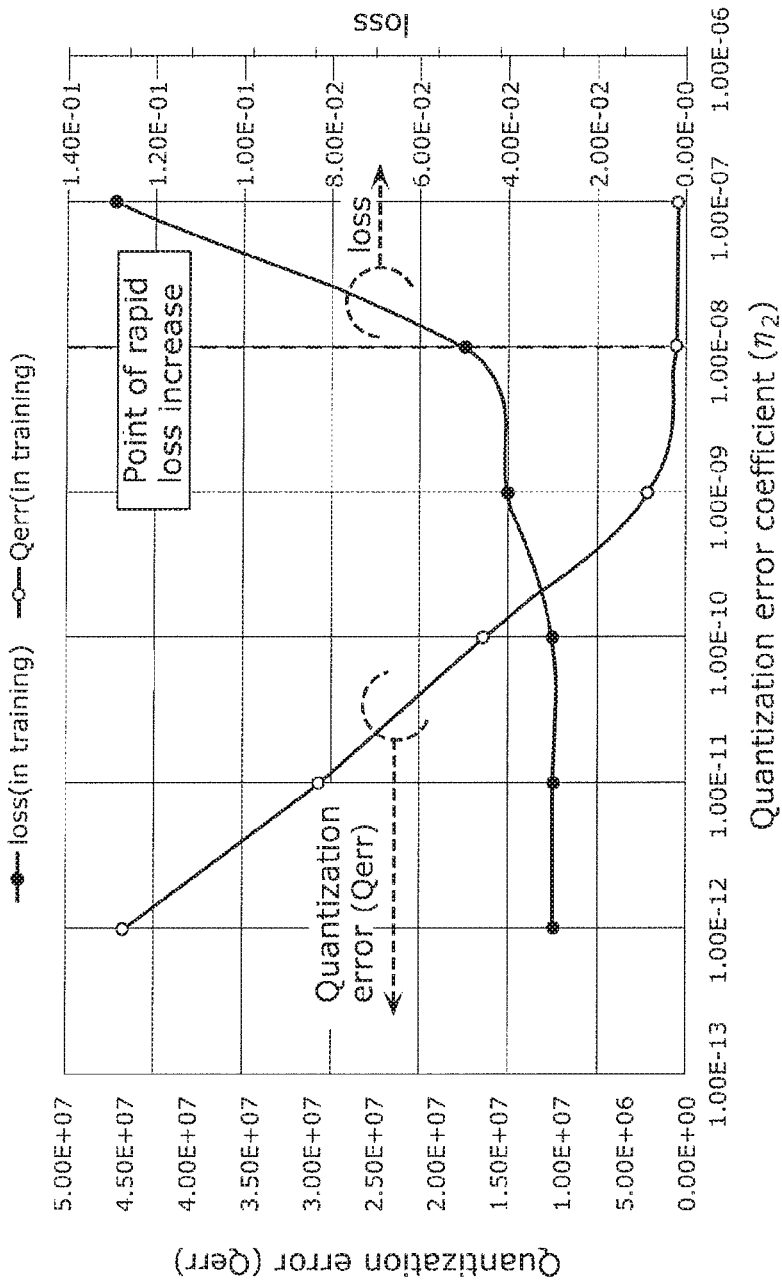
FIG. 3A is a diagram showing variations in loss and a quantization error with respect to a quantization error coefficient.
Figure 3B:
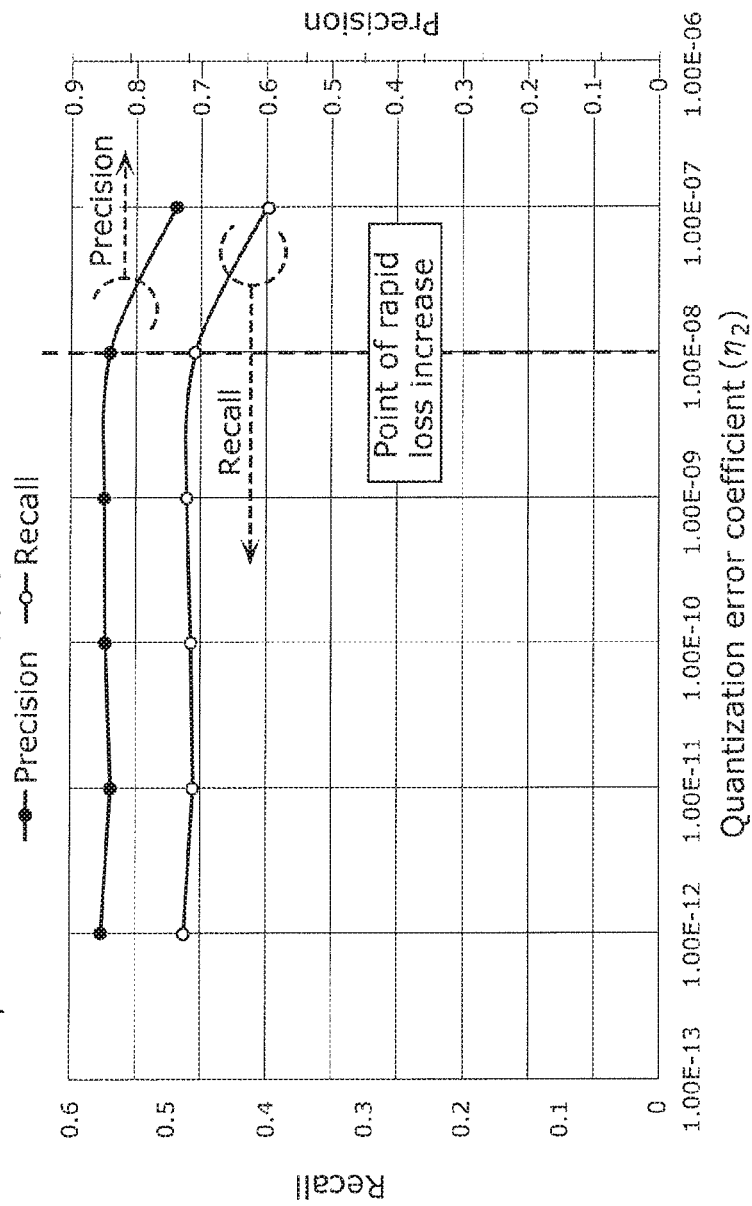
FIG. 3B is a diagram showing variations in the recall and precision with respect to the quantization error coefficient.

FIG. 3A is a diagram showing variations in the loss and the quantization error with respect to the quantization error coefficient, FIG. 3B is a diagram showing variations in the recall and precision with respect to the quantization error coefficient. FIG. 4 is a diagram for explaining statistical indicators including the recall and precision.

In FIG. 3A, the lateral axis indicates the values of learning coefficient $\eta_2$ represented by the quantization error coefficient in Expression (5), the vertical axis on the left indicates the quantization error, and the vertical axis on the right indicates the loss, i.e., the values of error function E(w) in Expression (5). In FIG. 3B, the lateral axis indicates the values of learning coefficient $\eta_2$ represented by the quantization error coefficient in Expression (5), the vertical axis on the left indicates the recall, and the vertical axis on the right indicates the precision. Note that variations shown in FIG. 3A and FIG. 3B are evaluated by simulating the cost function in which a quantization error is added to the error function as a regularization term.

FIG. 4 shows the number of data items in the case where an inference model represented as the quantization neural network makes "positive" inference or "negative" inference. Stated differently, the number of data items which are inferred as positive by the inference model but which are actually negative is represented as FP (False Positive), and the number of data items which are inferred as positive by the inference model and which are actually positive is represented as TP (True Positive). Similarly, the number of data items which are inferred as negative by the inference model but which are actually positive is represented as FN (False Negative), and the number of data items which are inferred as negative by the inference model and which are actually negative is represented as TN (True Negative).

Here, the precision, which is one of the statistical indicators represented as TP/(TP+FP), indicates the ratio of the number of actually positive data items to the number of data items inferred as positive by the inference model. The recall, which is one of the statistical indicators represented as TP/(TP+FN), indicates the ratio of the number of data items inferred as positive by the inference model to the number of actually positive data items.

As shown in FIG. 3A, the quantization error decreases with an increase in learning coefficient $\eta_2$. This suggests that the regularization term of cost function L(w) in Expression (5) is effective. Meanwhile, the loss, i.e., a value of error function E(w) in Expression (5), increases rapidly when an increase in learning coefficient $\eta_2$ exceeds a certain value. This suggests that learning coefficient $\eta_2$ in the regularization term of cost function L(w) in Expression (5) needs further adjustment.

Also, as shown in FIG. 3B, the accuracy represented by the precision and recall remains at substantially the same level with respect to an increase in learning coefficient $\eta_2$. Stated differently, there is no such correlation as that the precision and recall improve with an increase in learning coefficient $\eta_2$. Further, as shown in FIG. 3B, the accuracy degrades when an increase in learning coefficient $\eta_2$ exceeds a certain value.

Such degradation in the accuracy is considered as being related to a rapid increase in the loss shown in FIG. 3A, i.e., the value of error function E(w) in Expression (5), suggesting that learning is inhibited by the regularization term shown in Expression (5) which is too strong.

More specifically, the degradation in the accuracy is attributable to that the regularization term of 0 does not always result in an error function of 0 in the relation between error function E(w) and the regularization term shown in Expression (5).

In view of this, cost function determiner 101 according to the present embodiment determines a cost function that uses as a regularization term a quantization error function that satisfies the relation that the regularization term of 0 always results in a cost function of 0. This will be described below with reference to FIG. 5A and FIG. 5B.

Figure 5A:
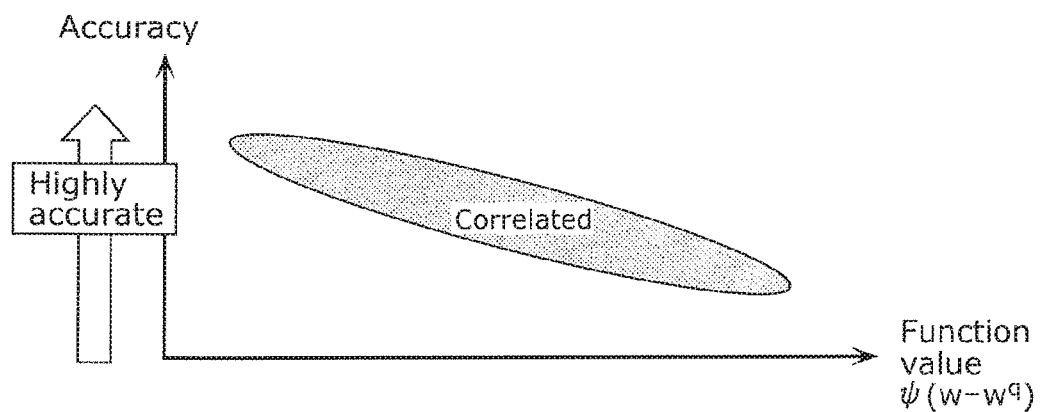
FIG. 5A is a diagram that schematically shows a relation between the accuracy and the function value of a regularization term according to the embodiment.
Figure 5B:
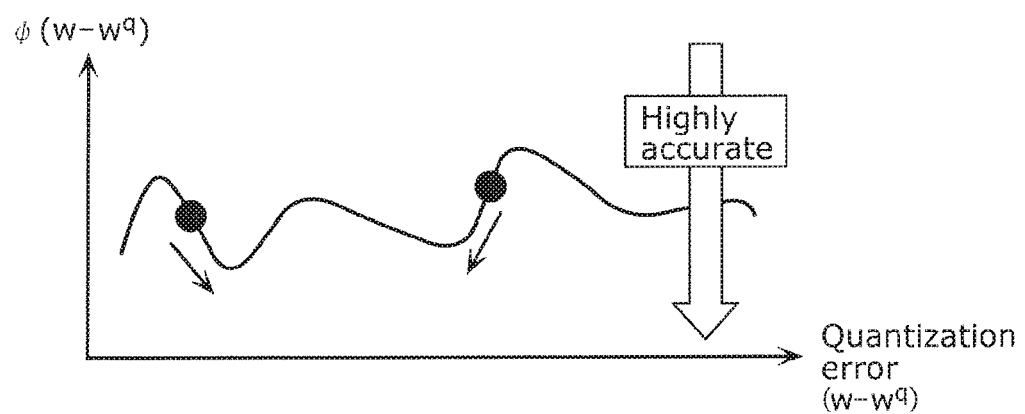
FIG. 5B is a diagram that schematically shows a relation between a quantization error and the function value of a regularization term according to the embodiment.

FIG. 5A is a diagram that schematically shows a relation between the accuracy and the function value of a regularization term according to the embodiment. FIG. 5B is a diagram that schematically shows a relation between a quantization error and the function value of a regularization term according to the embodiment.

Cost function L(w) determined by cost function determiner 101 is represented, for example, as in Expression (6) below, where $\eta_2$ represents a learning coefficient and $\psi(w-w^q)$ represents a function of a quantization error.

[Math. 6]

$$L(w)=E(w)+\eta_2\psi(w-w^q) \quad (6)$$

[Math. 7]

$$\psi(w-w^{q2})<\psi(w-w^{q1}) \quad (7)$$

Here, when the function value of the quantization error function satisfies the relation shown in Expression (7), (accuracy when quantization parameter is $w^{q2}$)>(accuracy when quantization parameter is $w^{q1}$) is satisfied. Stated differently, when the relation shown in Expression (7) is satisfied, the following relation is satisfied: the accuracy of an output value of (an inference model represented as) a quantization neural network corresponding to quantization parameter $w^{q2}$ is higher than the accuracy of an output value of (an inference model represented as) a quantization neural network corresponding to quantization parameter $w^{q1}$. Stated differently, FIG. 5A schematically shows the relation that the smaller the function value of function $\psi(w-w^q)$ of a quantization error shown in Expression (6), the smaller the function value of cost function L(w), i.e., the higher the accuracy. This means that the relation that the regularization term of 0 results in the cost function of 0 is satisfied.

Meanwhile, FIG. 5B shows that function $\psi(w-w^q)$ of a quantization error is not a monotonically increasing or monotonically decreasing function. Even with such non-monotonic function, the relation that the regularization term of 0 results in the cost function of 0 is achieved by use of the regularization term represented by function $\psi(w-w^q)$ of a quantization error having a negative correlation with the accuracy as shown in FIG. 5A. A specific method of determining a regularization term will be described later.

Note that the inference accuracy of the quantization neural network is not limited to the precision and recall indicating whether an output value of the quantization neural network is a true value. The inference accuracy thus may be at least one of or any combination of the precision, the recall, the F-measure calculated as the harmonic mean of the precision and the recall, and the hit rate.

Here, assuming that a plurality of output values inferred as positive by the quantization neural network belong to a first data group, such first data group can be represented as TP+FP as shown in FIG. 4. Assuming that a plurality of output values inferred as negative by the quantization neural network belong to a second data group, such second data group can be represented as FN+TN as shown in FIG. 4. Assuming that a plurality of output values which are actually positive among all the output values inferred by the quantization neural network belong to a third data group, such third data group can be represented as TP+FN as shown in FIG. 4. Assuming that a plurality of output values inferred as negative by the quantization neural network belong to a fourth data group, such fourth data group can be represented as FP+TN as shown in FIG. 4. In this case, the precision is the ratio of a fifth data group (TP), which is a group of actually positive output values, to the first data group (TP+FP), and the recall is the ratio of the fifth data group (TP) to the third data group (TP+FN). Also, the hit rate is the ratio of a sixth data group (TP+TN) to all output values (TP+FP+FN+TN), of which output values inferred by the quantization neural network coincide with the actual output values inferred by the neural network which represents weight parameters by floats.

Quantization parameter optimization device 10 with the above structure is capable of optimizing the quantization parameter in consideration of a quantization error, while preventing overfitting.

1-2. Hardware Configuration

Figure 6:
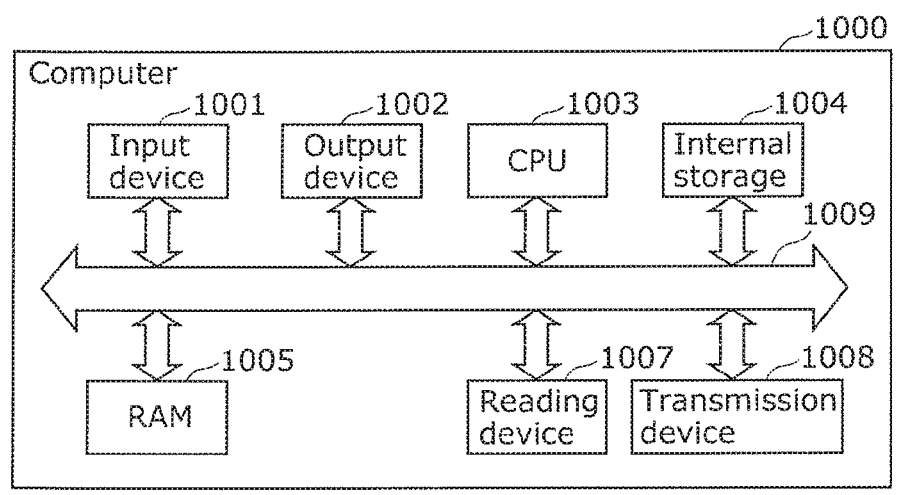
FIG. 6 is a diagram showing an exemplary hardware configuration of a computer that achieves by software the function of the quantization parameter optimization device according to the embodiment.

With reference to FIG. 6, the following describes the hardware configuration of quantization parameter optimization device 10 according to the present embodiment. FIG. 6 is a diagram showing an exemplary hardware configuration of computer 1000 that achieves by software the function of quantization parameter optimization device 10 according to the present embodiment.

As shown in FIG. 6, computer 1000 includes input device 1001, output device 1002, CPU 1003, internal storage 1004, RAM 1005, reading device 1007, transmission device 1008, and bus 1009. Input device 1001, output device 1002, CPU 1003, internal storage 1004, RAM 1005, reading device 1007, and transmission device 1008 are connected by bus 1009.

Input device 1001, which is a device serving as an user interface, accepts a user's operation. Examples of input device 1001 include an input button, a touch pad, and a touch panel display. In addition to accepting a touch operation by a user, input device 1001 may also be configured to accept a voice operation, a remote operation by a remote control, etc.

Internal storage 1004 is, for example, a flash memory. Internal storage 1004 may previously store at least one of a program that achieves the function of quantization parameter optimization device 10 and an application that utilizes the functional structure of quantization parameter optimization device 10.

RAM 1005, which is a random access memory, is used for storing data and so forth when the program or application is executed.

Reading device 1007 reads information from a recording medium such as a universal serial bus (USB) memory. Reading device 1007 reads the program or application as described above from the recording medium that stores such program or application, and causes internal storage 1004 to store the read program or application.

Transmission device 1008 is a communication circuit for wireless or wired communication. Transmission device 1008 performs communication with, for example, a server device connected to a network to download the program or application as described above from the server device, and causes internal storage 1004 to store the downloaded program or application.

CPU 1003, which is a central processing unit, copies the program or application stored in internal storage 1004 onto RAM 1005, and sequentially reads instructions included in such program or application from RAM 1005 to execute the instructions.

1-3. Quantization Parameter Optimization Method

Figure 7:
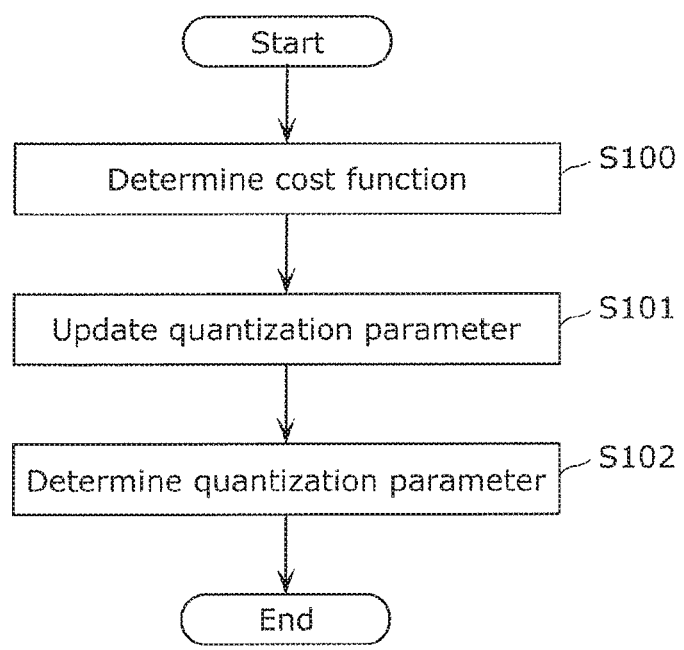
FIG. 7 is a flowchart of a quantization parameter optimization method according to the embodiment.

With reference to FIG. 7, the following describes a quantization parameter optimization method according to the present embodiment. FIG. 7 is a flowchart of the quantization parameter optimization method according to the present embodiment.

As shown in FIG. 7, in the quantization parameter optimization method, quantization parameter optimization device 10 first determines a cost function of the quantization neural network (S100). Quantization parameter optimization device 10 according to the present embodiment determines a cost function in which a regularization term, which is a function of a quantization error, is added to an error function, which is a function for determining an error between an output value of the quantization neural network (that represents an inference model) and a corresponding teaching data value.

Subsequently, quantization parameter optimization device 10 updates the quantization parameter, using the cost function determined in step S100 (S101). Quantization parameter optimization device 10 according to the present embodiment repeats updating the quantization parameter.

Subsequently, quantization parameter optimization device 10 determines the quantization parameter according to the result of step S101 (S102). Quantization parameter optimization device 10 according to the present embodiment determines, as an optimized quantization parameter of the quantization neural network, the quantization parameter with which a function value derived from the cost function satisfies a predetermined condition.

As described above, the quantization parameter optimization method according to the present embodiment is capable of optimizing the quantization parameter in consideration of a quantization error, while preventing overfitting.

The following describes a method of determining a regularization term used by quantization parameter optimization device 10 to determine a cost function. The following description assumes that the regularization term determiner determines the regularization term.

1-4. Regularization Term Determiner

Figure 8:
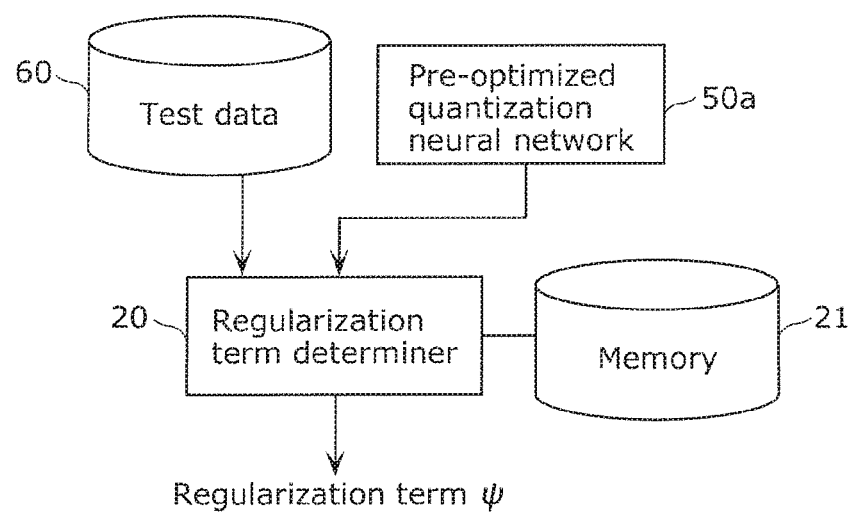
FIG. 8 is a diagram for explaining an overview of a determination process performed by a regularization term determiner according to the embodiment.

FIG. 8 is a diagram for explaining an overview of a determination process performed by regularization term determiner 20 according to the present embodiment.

Regularization term determiner 20 is a device that determines a regularization term according to the present embodiment. Regularization term determiner 20 according to the present embodiment stores the determined regularization term into memory 21. Regularization term determiner 20 may also output the determined regularization term to quantization parameter optimization device 10.

More specifically, using test data 60 and pre-optimized quantization neural network 50a provided with a weight error parameter, regularization term determiner 20 generates learning data that is a dataset including quantization errors and the corresponding accuracies of pre-optimized quantization neural network 50a. Here, the weight error parameter is a weight parameter to which a plurality of random errors are assigned to determine a candidate of the quantization parameter. Regularization term determiner 20 then determines a regularization term, using the generated learning data, on the basis of the separating hyperplane obtained by performing learning by a support vector machine (SVM). Note that an SVM is a method of determining the boundary (boundary line or boundary plane) that separates data classified into two classes clearly into two classes. The SVM determines such boundary by maximizing the margin indicating the distance from the boundary to the nearest vector (support vector).

Figure 9:
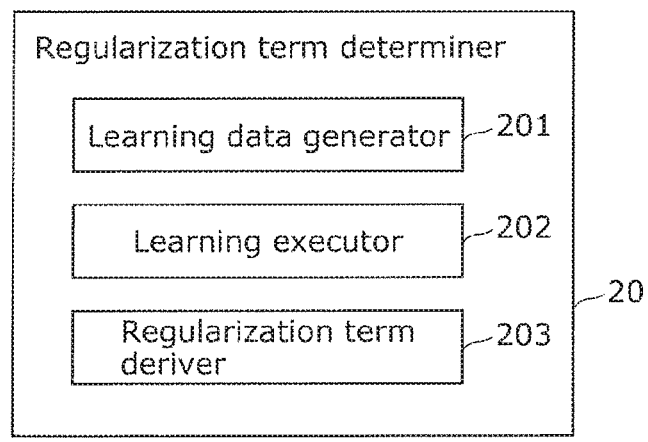
FIG. 9 is a block diagram of a functional structure of the regularization term determiner according to the embodiment.

FIG. 9 is a block diagram of a functional structure of regularization term determiner 20 according to the present embodiment.

As shown in FIG. 9, regularization term determiner 20 includes learning data generator 201, learning executor 202, and regularization term deriver 203.

<Learning Data Generator 201>

Learning data generator 201 assigns a label, which indicates whether the accuracy of an output value for test data is higher or lower than a predetermined criterion, to the value of the weight error parameter corresponding to such output value. More specifically, learning data generator 201 assigns a label to each value of the weight error parameter, which is the weight parameter to which a plurality of errors are assigned, corresponding to an output value for the test data from the quantization neural network to which such weight error parameter has been provided. Through this process, learning data generator 201 generates learning data that is a dataset including the values of the weight error parameter and the corresponding accuracies.

Learning data generator 201 according to the present embodiment first obtains output values for test data 60, using pre-optimized quantization neural network 50a to which the weight error parameter is set, which is the weight parameter to which a plurality of random errors are assigned. Learning data generator 201 then assigns, to the value of the weight error parameter corresponding to each output value, a label indicating whether the accuracy of such output value is higher or lower than the predetermined criterion. Through this process, learning data generator 201 generates learning data that is a dataset including the values of the weight error parameter and the corresponding accuracies, and stores the learning data into memory 21. Here, the predetermined criterion is, for example, the accuracy of an output value for test data 60 that has been obtained using pre-optimized quantization neural network 50a to which a weight parameter represented by a real number or a floating-point precision (float) has been set.

Further, learning data generator 201 classifies the accuracies of the obtained output values into two classes, i.e., whether the accuracy is higher or lower than the predetermined criterion, and assigns a label indicating the classification result to the value of the weight error parameter corresponding to each output value. Note the weight error parameter corresponds to a quantization error. Through the above processes, learning data generator 201 generates learning data that is a dataset indicating a correlation between the quantization errors and the corresponding accuracies.

<Learning Executor 202>

Learning executor 202 performs learning by an SVM, using the learning data generated by learning data generator 201. Through such SVM learning, learning executor 202 obtains a separating hyperplane that is a plane separating the values of the weight error parameter into ones corresponding output values with accuracies higher than the predetermined criterion and ones corresponding to output values with accuracies lower than the predetermined criterion. Examples of SVM Learning include two-class linear SVM learning and one-class nonlinear SVM learning.

Note that two-class linear SVM learning, which is also referred to as linear SVM, is the learning of a separating hyperplane, based on the support vectors of the two classes, that enables the Euclidean distance between these support vectors to be maximum (the margin is maximum). This achieves the separating hyperplane that completely separates the two classes. Meanwhile, one-class nonlinear SVM learning is the learning on a single class as teaching data (normal data) to obtain the separating hyperplane that separates the teaching data (normal data) and outlier data represented by values deviated from the teaching data (normal data).

Learning executor 202 according to the present embodiment performs SVM learning as machine learning, using the learning data generated by learning data generator 201. More specifically, learning executor 202 obtains the separating hyperplane that clearly classifies, into two classes, the values of the weight error parameter, included in the learning data, to which labels are assigned. Here, each of the labels indicates one of the two classes into which the corresponding value of the weight error parameter is classified. Stated differently, learning executor 202 obtains the separating hyperplane that most clearly separates a group of quantization errors corresponding to the output values with the accuracies lower than the predetermined criterion and a group of quantization errors corresponding to the output values with the accuracies higher than the predetermined criterion.

Figure 10A:
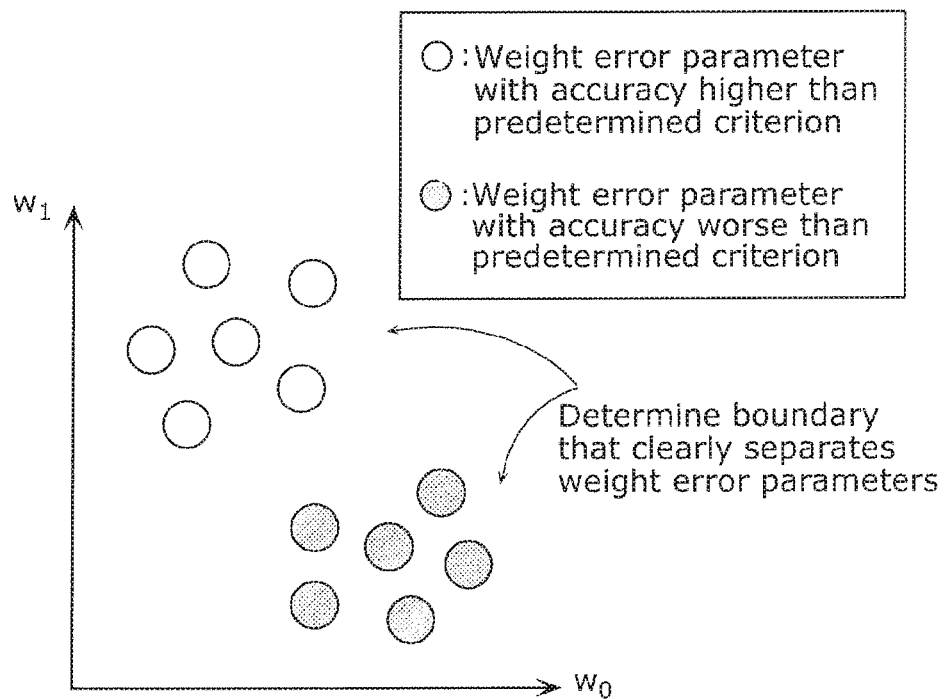
FIG. 10A is a diagram that schematically shows the distribution of labeled values of a weight error parameter when a weight parameter according to the embodiment is two-dimensional.
Figure 10B:
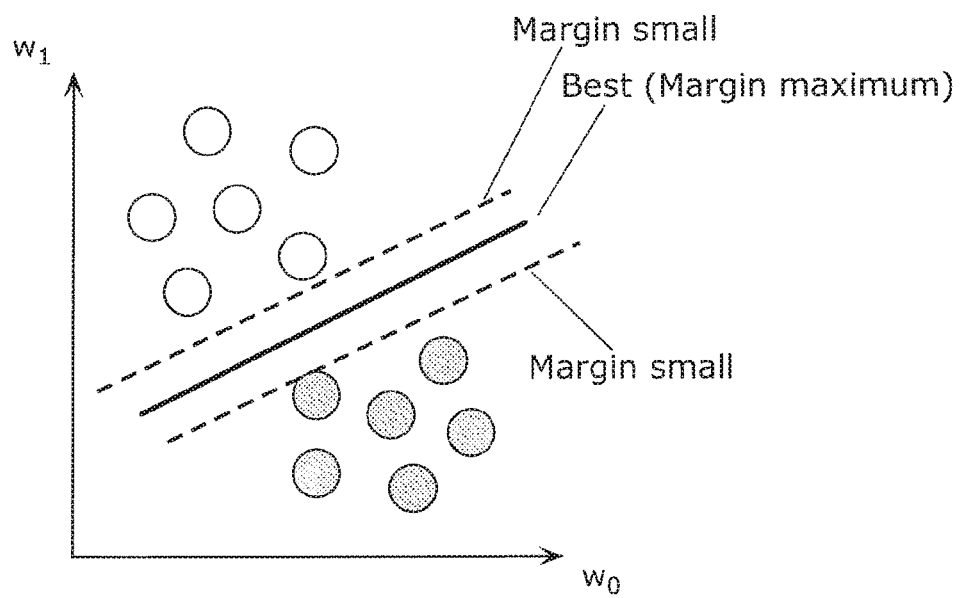
FIG. 10B is a diagram that schematically shows the result of performing two-class linear SVM learning on the distribution shown in FIG. 10A.
Figure 10C:
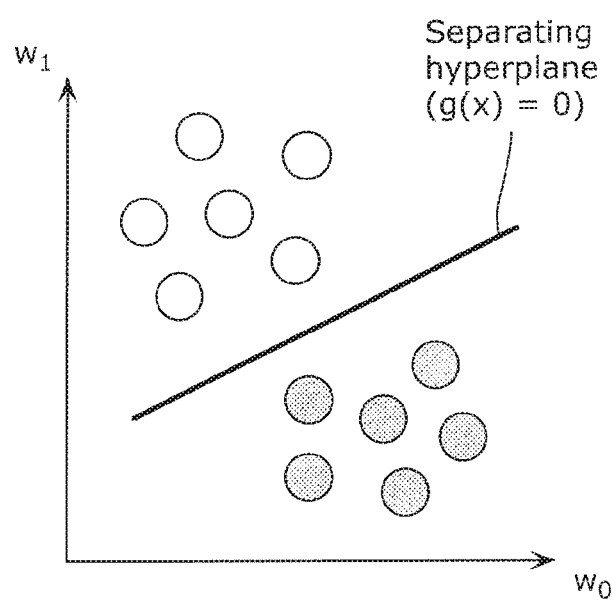
FIG. 10C is a diagram that schematically shows a separating hyperplane obtained for the distribution shown in FIG. 10A.

With reference to FIG. 10A through FIG. 10C, an example case will be described where two-class linear SVM learning is performed to obtain the separating hyperplane. Note that the following description assumes that the weight error parameter is two-dimensional.

FIG. 10A is a diagram that schematically shows the distribution of the labeled values of the weight error parameter when the weight parameter according to the present embodiment is two-dimensional. FIG. 10B is a diagram that schematically shows the result of performing two-class linear SVM learning on the distribution shown in FIG. 10A. FIG. 10C is a diagram that schematically shows the separating hyperplane obtained for the distribution shown in FIG. 10A.

FIG. 10A shows the values of the weight error parameter (corresponding to the output values) with the accuracies higher than the predetermined criterion and the values of the weight error parameter (corresponding to the output values) with the accuracies worse than the predetermined criterion. Learning executor 202 performs two-class linear SVM learning on the values of the weight error parameter shown in FIG. 10A to obtain the boundary that clearly separates the values of the weight error parameter with the accuracies higher than the predetermined criterion and the values of the weight error parameter with the accuracies worse than the predetermined criterion. Through this, learning executor 202 obtains the best boundary, i.e., the boundary at which the margin is maximum as shown, for example, in FIG. 10B. As a result, learning executor 202 obtains the boundary shown in FIG. 10B as the separating hyperplane represented by $g(x)=0$ as shown, for example, in FIG. 10C.

Note that the above description has explained the case where the weight error parameter is two-dimensional, the values of which can be classified into two groups by a straight line serving as the separating hyperplane, but there may be the case where separation by a straight line is not possible.

Figure 11A:
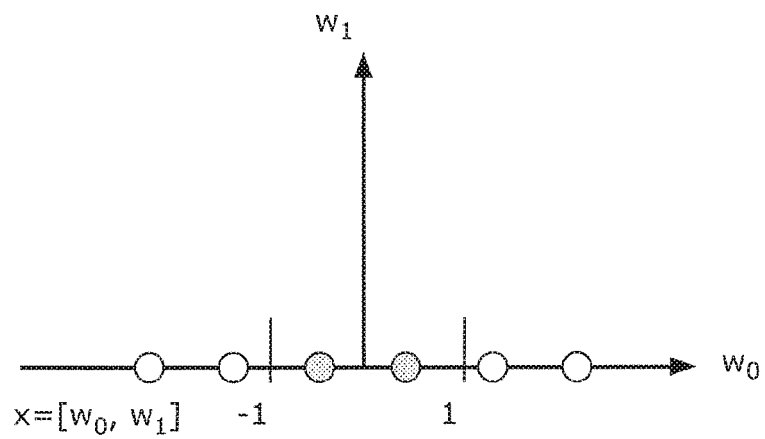
FIG. 11A is a diagram that schematically shows an example case where the values of the weight error parameter according to the embodiment are inseparable into two classes by a straight line.
Figure 11B:
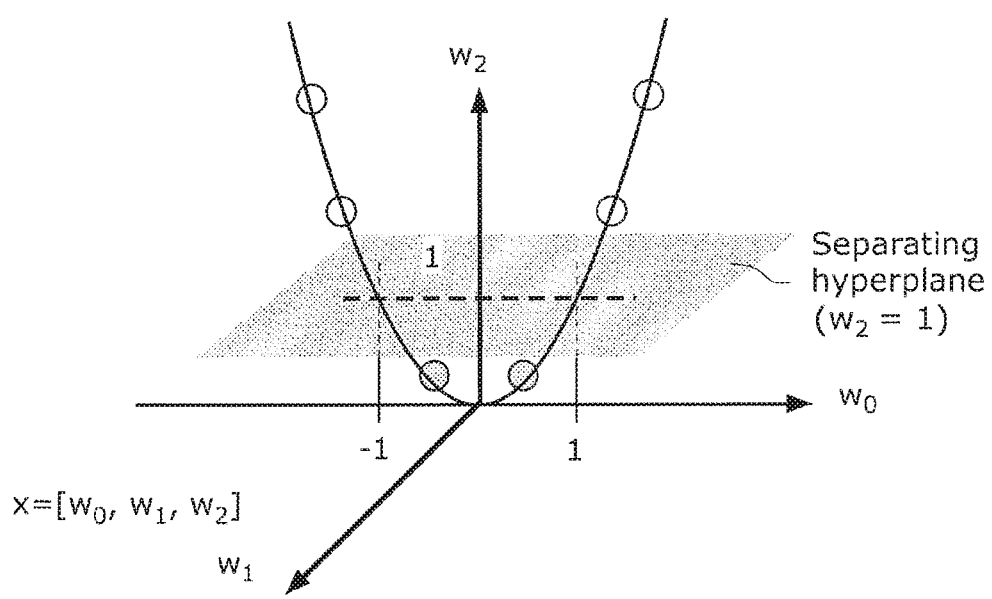
FIG. 11B is a diagram that schematically shows an example case where the values of the weight error parameter shown in FIG. 11A are separable into two classes by a plane by extending the dimension of the weight error parameter into a higher dimension.

FIG. 11A is a diagram that schematically shows an example case where the values of the weight error parameter according to the present embodiment are inseparable into two classes by a straight line. FIG. 11B is a diagram that schematically shows an example case where the values of the weight error parameter shown in FIG. 11A are separable into two classes by a plane by extending the dimension of the weight error parameter into a higher dimension.

Stated differently, when the values of the weight error parameter exhibit the distribution as shown in FIG. 11A, for example, any line cannot clearly separate the values of the weight error parameter with the accuracies higher than the predetermined criterion from the values of the weight error parameter with the accuracies worse than the predetermined criterion. In such a case, the values of the weight error parameter can be separated by a plane by extending the dimension of the weight error parameter into a higher dimension, e.g., three-dimension. When the dimension of the weight error parameter is extended into a higher dimension as described above, the distance from the boundary (boundary plane) can be considered, as in the case where the values of the weight error parameter are separable by a straight line (when linear separation is possible).

In this case, the separating hyperplane represented by $g(x)=0$ is obtained through two-class linear SVM learning or one-class nonlinear SVM learning.

As described above, learning executor 202 is capable of obtaining the separating hyperplane by performing SVM learning. Stated differently, learning executor 202 is capable of obtaining the separating hyperplane represented by g(x)=0 by performing two-class linear SVM learning or one-class nonlinear SVM learning.

<Regularization Term Deriver 203>

Regularization term deriver 203 derives a function g(x) from the separating hyperplane represented by g(x)=0 obtained by learning executor 202 and determines regularization term ψ on the basis of the derived g(x).

Regularization term deriver 203 according to the present embodiment may determine, as regularization term ψ, −g(x) obtained by reversing the polarity of the derived g(x) or tan h(−g(x)), which is a function of g(x) using tan h that is a monotonically increasing function with the value range (−1, 1).

For example, when the separating hyperplane is obtained by performing two-class linear SVM learning as SVM learning, regularization term deriver 203 derives g(x) represented in Expression (8) below.

[Math. 7]

$$A^T x + b = g(x) \tag{8}$$

Here, x represents a quantization error of an n-dimensional vector, A represents the n-dimensional vector, and b represents a constant.

Figure 12:
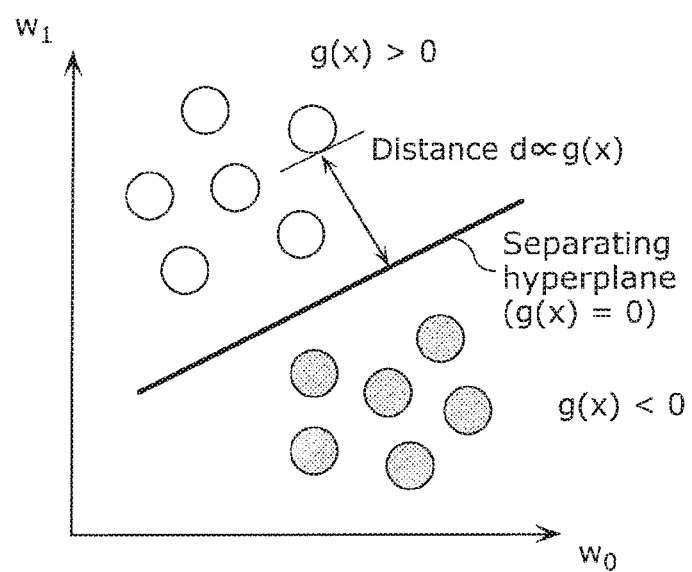
FIG. 12 is a diagram for explaining a method of deriving a regularization term from the separating hyperplane according to the embodiment.

FIG. 12 is a diagram for explaining a method of deriving a regularization term from the separating hyperplane according to the present embodiment. FIG. 12 shows g(x)=0 indicating the separating hyperplane in the distribution of the quantization errors corresponding to the distribution of the values of the weight error parameter shown in FIG. 10C. Here, g(x) shown in Expression (8) is a function indicating the value that is proportional to the distance between x and the separating hyperplane (g(x)=0). In Expression (8), A represents the n-dimensional vector that indicates the normal direction with respect to the separating hyperplane. A and b in Expression (8) can be obtained from g(x)=0 indicating the separating hyperplane shown in FIG. 12. Stated differently, g(x) represented in Expression (8) can be derived from g(x)=0 indicating the separating hyperplane.

As can be known from the distribution of the quantization errors shown in FIG. 12, for example, assuming that the accuracy is high in the region of g(x)>0, a greater function value of g(x) is likely to result in a higher accuracy. In this case, when −g(x) obtained by reversing the polarity of the derived g(x) is determined as the regularization term, such determined regularization term can be represented as a function of a quantization error, and have a negative correlation with the accuracy.

From the above, regularization term deriver 203 according to the present embodiment may determine −g(x) obtained by reversing the polarity of the derived g(x) as regularization term ψ. Alternatively, regularization term deriver 203 may determine tan h(−g(x)) as regularization term ψ. The use of tan h allows the function value of −g(x) to increase monotonically and fall within the range (−1, 1), which facilitates cost function computation.

Also, when the distribution of the quantization errors are inseparable by a straight line (linear separation is impossible), the separation by a plane (hyperplane) is possible by extending the dimension of the distribution of the quantization errors to a higher dimension. In such a case, when one-class nonlinear SVM learning is performed to obtain the separating hyperplane represented by g(x)=0, the separating hyperplane can be expressed as in Expression (9) below, where the left-hand side is 0. g(x) can thus be derived.

From the above, when the separating hyperplane is obtained by performing one-class nonlinear SVM learning as SVM learning, regularization term deriver 203 can derive g(x) represented in Expression (9) below. Note that one-class nonlinear SVM learning may certainly be employed as SVM learning when the dimension of the distribution of the quantization errors is not extended to a higher dimension.

[Math. 8]

$$\sum_{i=1}^{N} \alpha_i K(\tilde{w}_{si}, w - w^q) + b = g(x) \tag{9}$$

Here, $\alpha_i$ represents a coefficient, K represents a kernel function,

[Math. 9]

$$\tilde{w}_{si}$$

represents a support vector, and b represents a constant.

Note that the kernel function may also be, for example, a Gaussian kernel represented in Expression (10).

[Math. 10]

$$K(x, x') = \exp\left(-\frac{\|x - x'\|^2}{2\sigma^2}\right) \tag{10}$$

Note that in an SVM algorithm, all data items in the feature space appear as inner product. For this reason, the use of the kernel function enables the computation of the inner product even in the case where a specific form of the function is unknown when the data is mapped to the feature space. Also, only the computation of the kernel function in the input space is necessary without having to compute the inner product in a high-dimensional feature space. This achieves the advantage of being able to significantly reduce computation and memory.

Stated differently, the derivation of g(x) with the use of the kernel function results in a signification reduction in computation and memory required to compute the function value of the cost function that uses the regularization term having been determined on the basis of g(x).

Note that the kernel function is not limited to the Gaussian kernel represented in Expression (10). For example, the sigmoid kernel represented in Expression (11) below or the polynomial kernel represented in Expression (12) below may thus be employed. In Expression (12), p represents a degree of a polynomial.

[Math. 11]

$$K(x_1, x_2) = \tan h(bx_1^T x_2 + c) \tag{11}$$

[Math. 12]

$$K(x_1, x_2) = (x_1^T x_2 + c)^p \tag{12}$$

As described above, regularization term deriver 203 is capable of determining, as regularization term ψ, −g(x) that is obtained by reversing the polarity of the derived g(x) or tan h(−g(x)) that uses tan h. Regularization term deriver 203 then stores the determined regularization term ψ into memory 21, and at the same time outputs it to quantization parameter optimization device 10.

1-5. Regularization Term Derivation Method

Figure 13:
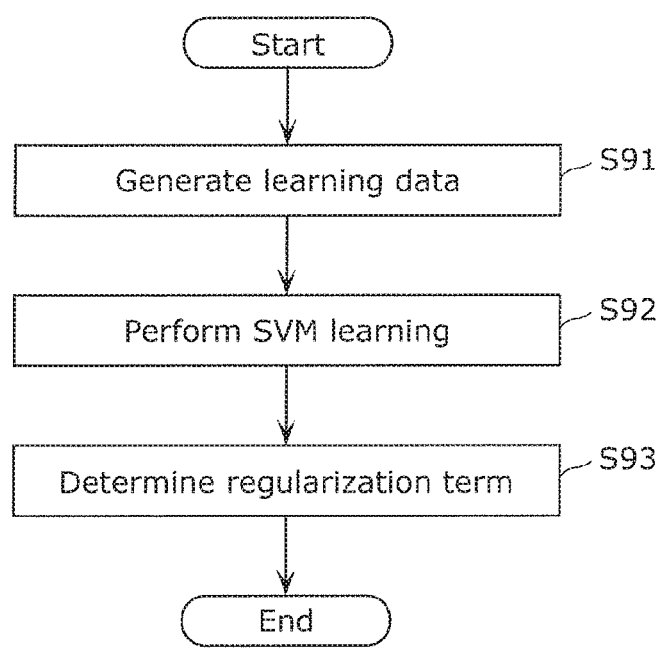
FIG. 13 is a flowchart of a regularization term derivation method according to the embodiment.

With reference to FIG. 13, the following describes a regularization term derivation method according to the present embodiment. FIG. 13 is a flowchart of the regularization term derivation method according to the present embodiment.

As shown in FIG. 13, in the regularization term derivation method, regularization term determiner 20 first generates learning data (S91). Regularization term determiner 20 according to the present embodiment obtains output values for test data 60 that have been obtained using pre-optimized quantization neural network 50a to which weight errors are provided. Here, the weight errors are weights represented by real numbers or floating-point precisions (floats) to which random errors are added. Regularization term determiner 20 assigns, to the weight errors corresponding to the obtained output values, labels that classify the output values into two classes based on whether the accuracy of each output value is higher or lower than the predetermined criterion. Regularization term determiner 20 generates learning data that is a dataset including the weight errors and the corresponding accuracies. Note that since a weight error, when the original weight is subtracted from it, serves as a quantization error, the generation of learning data that is a dataset including the quantization errors and the corresponding accuracies is the same as the generation of a dataset including the weight errors and the corresponding accuracies.

Subsequently, regularization term determiner 20 performs SVM learning, using the learning data generated in step S91 (S92). Regularization term determiner 20 according to the present embodiment performs two-class linear SVM learning or one-class nonlinear SVM learning, using the learning data generated in step S91. Through this, regularization term determiner 20 obtains the separating hyperplane represented by $g(x)=0$.

Regularization term determiner 20 then determines the regularization term on the basis of the separating hyperplane represented by $g(x)=0$ obtained in step S92 (S93). Regularization term determiner 20 according to the present embodiment derives $g(x)$ from the separating hyperplane represented by $g(x)=0$. Subsequently, regularization term determiner 20 determines, as the regularization term, $-g(x)$ or $\tan h(-g(x))$ on the basis of the derived $g(x)$.

As described above, the regularization term derivation method according to the present embodiment is capable of deriving regularization term ψ that gives a negative correlation between the function value of regularization term ψ and the inference accuracy of the quantization neural network.

1-6. Effect, Etc.

As described above, the present embodiment is capable of deriving regularization term ψ that gives a negative correlation between the function value of regularization term ψ and the inference accuracy of the quantization neural network. This enables to determine a cost function in which the derived regularization term ψ is added to an error function.

Furthermore, with the present embodiment, the use of such cost function enables to optimize the quantization parameter in consideration of a quantization error, while preventing overfitting.

The following describes an overview of the processing procedure for deriving a regularization term by two-class linear SVM and an overview of the processing procedure for deriving a regularization term by one-class nonlinear SVM.

Figure 14:
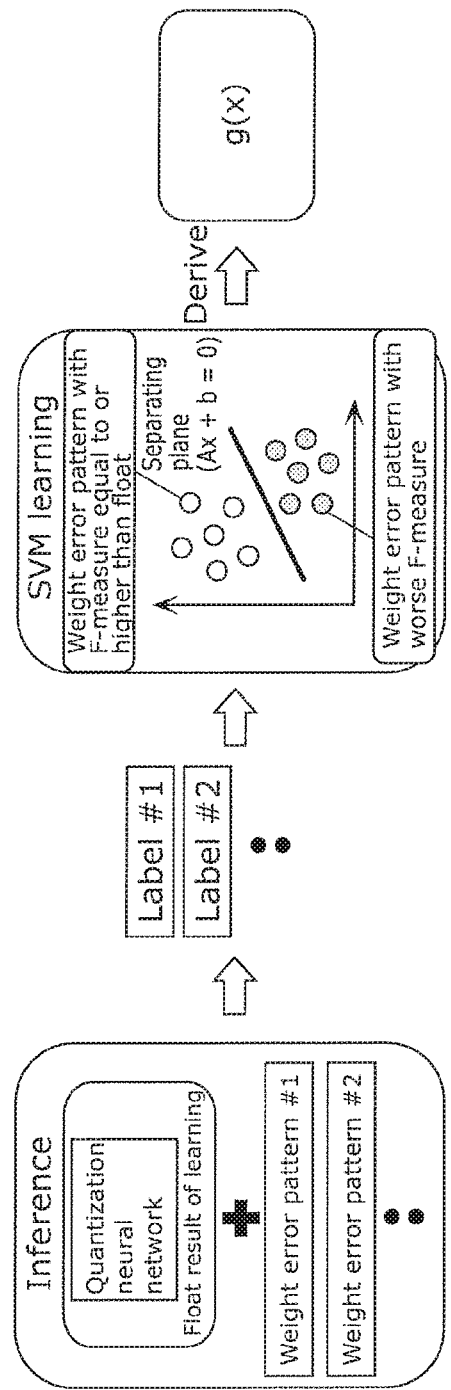
FIG. 14 is a diagram that schematically shows an overview of the processing procedure for deriving a regularization term by two-class linear SVM according to the embodiment.
Figure 15:
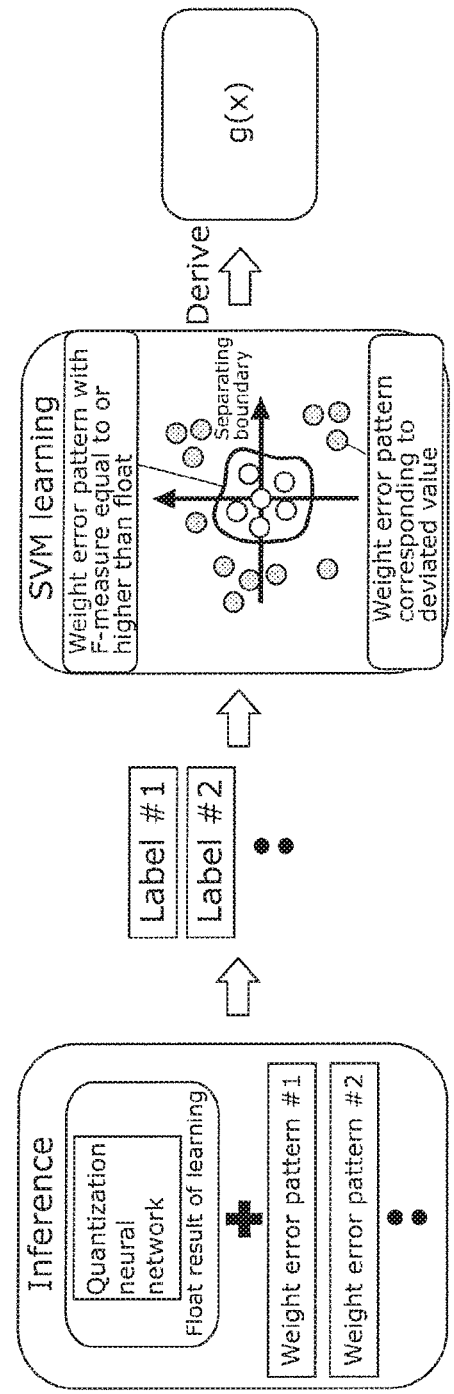
FIG. 15 is a diagram that schematically shows an overview of the processing procedure for deriving a regularization term by one-class nonlinear SVM.

FIG. 14 is a diagram that schematically shows an overview of the processing procedure for deriving a regularization term by two-class linear SVM according to the embodiment. FIG. 15 is a diagram that schematically shows an overview of the processing procedure for deriving a regularization term by one-class nonlinear SVM. In FIG. 14 and FIG. 15, weight error pattern #1 and so forth correspond to the values of the weight error parameter in the above embodiment. Label #1 and so forth are labelled weight error patterns, and correspond to learning data that is a dataset including the values of the weight error parameter and the corresponding accuracies in the above embodiment. FIG. 14 and FIG. 15 are different in SVM learning to be used, two-class linear SVM learning or one-class nonlinear SVM learning, and thus the form of $g(x)$ to be derived is different.

Here, in the SVM algorithms, all data items in the feature space appear as inner product.

$g(x)$ shown in FIG. 14, which is obtained by two-class linear SVM learning, appears as a simple inner product. As such, the use of $\tan h(-g(x))$ as a regularization term facilitates the computation of the function value (loss) of the cost function.

Meanwhile, $g(x)$ shown in FIG. 15, which is obtained by one-class nonlinear SVM learning, is obtained in the form that uses a kernel function. Note that one-class nonlinear SVM maps teaching data to a high-dimensional feature space, using a method known as kernel trick that handles all items of teaching data serving as normal data in the learning data as cluster 1 and handles only the origin point as cluster −1. When this is done, the teaching data is mapped distantly from the origin point, as a result of which items of the learning data not similar to the teaching data gather around the origin point. As such, it can be said that the use of one-class nonlinear SVM has higher separability that two-class linear SVM.

$g(x)$ shown in FIG. 15, when expressed by use of a kernel function, enables the computation of inner product even when a specific form of the function is unknown. This thus enables the computation of the function value (loss) of a complex cost function.

OTHER EMBODIMENTS

The quantization parameter optimization method and so forth according to the present disclosure have been described above on the basis of the embodiment, but the present disclosure is not limited to such embodiment. The scope of the present disclosure also includes a variation achieved by making various modifications to the above embodiment that can be conceived by those skilled in the art without departing from the essence of the present disclosure, and an embodiment achieved by combining one or more of the structural components according to the embodiment.

The scope of one or more aspects of the present disclosure may also include:

(1) One or more of the structural components included in the quantization parameter optimization device described above may be implemented as a computer system that includes a microprocessor, a ROM, a RAM, a hard disk unit, a display unit, a keyboard, a mouse, and so forth. The RAM or the hard disk unit stores a computer program. The microprocessor's operating in accordance with such computer program enables to achieve its function. Here, the computer program is a collection of command codes that indicate instructions to the computer for achieving a predetermined function;

(2) One or more of the structural components included in the quantization parameter optimization device described above may be implemented as a single system large scale integration (LSI). A system LSI is a super-multifunctional LSI fabricated by integrating a plurality of structural components on a single chip. The system LSI is more specifically a computer system that includes a microprocessor, a ROM, a RAM, and so forth. The RAM stores a computer program. The microprocessor's operating in accordance with the computer program enables the system LSI to achieve its function;

(3) One or more of the structural components included in the quantization parameter optimization device described above may be implemented as an integrated circuit (IC) card or a single module removable from each device. The IC card or the module is a computer system that includes a microprocessor, a ROM, a RAM and so forth. The IC card or the module may include the super-multifunctional LSI described above. The microprocessor's operating in accordance with a computer program enables the IC card or the module to achieve its function. Such IC card or module may be tamper resistant;

(4) One or more of the structural components included in the quantization parameter optimization device described above may be implemented as the computer program or digital signals recorded on a computer-readable recording medium such as a flexible disk, a hard disk, a CD-ROM, an MO, a DVD, a DVD-ROM, a DVD-RAM, a Blu-ray® disc (BD), and a semiconductor memory. One or more of the structural components included in each of the quantization parameter optimization device described above may also be digital signals recorded in such recording medium;

One or more of the structural components included in the quantization parameter optimization device described above may transmit the computer program or the digital signals via, for example, a telecommunication line, a wireless or wired communication line, a network represented by the Internet, and data broadcasting;

(5) The present disclosure may also be the above-described method. The present disclosure may also be a computer program that enables such method to be implemented by a computer, or digital signals that form the computer program;

(6) The present disclosure may also be a computer system that includes a microprocessor and a memory, in which the memory may store the computer program and the microprocessor may operate in accordance with the computer program;

(7) The present disclosure may also be achieved by transmitting the program or the digital signals recorded on the recording medium or by transmitting the program or the digital signals via, for example, the network, thereby enabling another independent computer system to carry out the present disclosure; and (8) The above embodiment and variations may be combined.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable for use as, for example, an image processing method, a speech recognition method, or an object control method as a method of implementing a neural network in a computer, etc.

The invention claimed is:

1. A quantization parameter optimization method of optimizing a quantization parameter that is a weight parameter in a neural network having been quantized, the quantization parameter optimization method comprising:
   determining a cost function in which a regularization term is added to an error function, the regularization term being a function of a quantization error that is an error between the weight parameter and the quantization parameter, the error function being a function for determining an error between an output value of the neural network and a corresponding teaching data value;
   updating the quantization parameter by use of the cost function; and
   determining, as an optimized quantization parameter of a quantization neural network, the quantization parameter with which a function value derived from the cost function satisfies a predetermined condition, the optimized quantization parameter being obtained as a result of repeating the updating, the quantization neural network being the neural network, the weight parameter of which has been quantized,
   wherein the function value derived from the regularization term and an inference accuracy of the quantization neural network are negatively correlated.

2. The quantization parameter optimization method according to claim 1,
   wherein the inference accuracy is at least one of or any combination of a precision, a recall, an F-measure calculated as a harmonic mean of the precision and the recall, and a hit rate, when the inference accuracy indicates whether an output value of the quantization neural network is a true value.

3. The quantization parameter optimization method according to claim 1, further comprising:
   generating learning data that is a dataset including values of a weight error parameter that is the weight parameter to which a plurality of errors have been added and accuracies of output values for test data, by assigning labels to the values of the weight error parameter corresponding to the output values, the labels indicating whether the accuracies of the output values are each higher or lower than a predetermined criterion, the output values being obtained for the test data by use of the quantization neural network provided with the weight error parameter,
   performing learning by a support vector machine (SVM) by use of the learning data generated to obtain a separating hyperplane that is a plane separating the values of the weight error parameter into values corresponding to ones of the output values with accuracies higher than the predetermined criterion and values corresponding to ones of the output values with accuracies lower than the predetermined criterion; and
   determining the regularization term based on the separating hyperplane obtained in the performing of the learning.

4. The quantization parameter optimization method according to claim 3,
   wherein in the determining of the regularization term, $g(x)$ is derived from the separating hyperplane to determine the regularization term based on the $g(x)$ derived, and when the separating hyperplane is obtained by performing two-class linear SVM learning as the learning by the SVM, the g(x) is represented by $$A^T x + b = g(x),$$

where x represents the quantization error of an n-dimensional vector, A represents the n-dimensional vector, and b represents a constant.

5. The quantization parameter optimization method according to claim 3,
wherein in the determining of the regularization term, g(x) is derived from the separating hyperplane to determine the regularization term based on the g(x) derived, and
when the separating hyperplane is obtained by performing one-class nonlinear SVM learning as the learning by the SVM, the g(x) is represented by $$\sum_{i=1}^{N} \alpha_i K(\tilde{w}_{si}, w - w^q) + b = g(x),$$

where $w^q$ represents the quantization parameter, $w - w^q$ represents the quantization error, $\alpha_i$ represents a coefficient, K represents a kernel function, $$\tilde{w}_{si}$$

represents a support vector, and b represents a constant.

6. The quantization parameter optimization method according to claim 5,
wherein the kernel function is a Gaussian kernel.

7. The quantization parameter optimization method according to claim 5,
wherein the kernel function is a sigmoid kernel.

8. The quantization parameter optimization method according to claim 5,
wherein the kernel function is a polynomial kernel.

9. The quantization parameter optimization method according to claim 4,
wherein in the determining of the regularization term, the regularization term is determined based on $\tan h(-g(x))$ that is a function of the g(x).

10. A quantization parameter optimization device that determines a quantization parameter that is a weight parameter in a neural network having been quantized, the quantization parameter optimization device comprising:
a cost function determiner that determines a cost function in which a regularization term is added to an error function, the regularization term being a function of a quantization error that is an error between the weight parameter and the quantization parameter, the error function being a function for determining an error between an output value of the neural network and a corresponding teaching data value;
an updater that updates the quantization parameter by use of the cost function; and
a quantization parameter determiner that determines, as an optimized quantization parameter of a quantization neural network, the quantization parameter with which a function value derived from the cost function satisfies a predetermined condition, the optimized quantization parameter being obtained as a result of the updater repeating updating the quantization parameter, the quantization neural network being the neural network, the weight parameter of which has been quantized,
wherein the function value derived from the regularization term and an inference accuracy of the quantization neural network are negatively correlated.

* * * * *